United States Patent
Foxman (10) Patent No.: US 9,302,162 B1
(45) Date of Patent: Apr. 5, 2016

(54) GOLF BAG HAVING A REMOVABLE GOLF BAG

(71) Applicant: Theodore D. Foxman, Highland Park, IL (US)

(72) Inventor: Theodore D. Foxman, Highland Park, IL (US)

( * ) Notice: Subject to any disclaimer, the term of this patent is extended or adjusted under 35 U.S.C. 154(b) by 0 days.

(21) Appl. No.: 14/597,215

(22) Filed: Jan. 14, 2015

(51) Int. Cl.
*A63B 55/00* (2015.01)
*A63B 55/04* (2006.01)

(52) U.S. Cl.
CPC ............ *A63B 55/008* (2013.01); *A63B 55/005* (2013.01); *A63B 55/04* (2013.01)

(58) Field of Classification Search
CPC ...... A63B 55/00; A63B 55/08; A63B 55/004; A63B 55/53; A63N 2055/002
USPC ................ 206/315.3–315.5, 315.7; 248/96
See application file for complete search history.

(56) References Cited

U.S. PATENT DOCUMENTS

| | | | |
|---|---|---|---|
| 1,607,802 A | 11/1926 | Shank | |
| 2,437,405 A | 3/1948 | Robinson | |
| 3,128,812 A * | 4/1964 | Scheurer | 206/315.4 |
| 3,674,072 A | 7/1972 | Shuto | |
| 4,142,563 A * | 3/1979 | Ackerfeldt et al. | 206/315.5 |
| 4,779,728 A * | 10/1988 | Hanifl et al. | 206/366 |
| 4,927,052 A | 5/1990 | Marthaler et al. | |
| 5,042,704 A | 8/1991 | Izzo | |
| 5,050,730 A * | 9/1991 | Suberbielle | 206/315.4 |
| 5,071,147 A * | 12/1991 | Stansbury | 280/47.19 |
| 5,082,218 A * | 1/1992 | Hoffman | 248/96 |
| 5,112,068 A * | 5/1992 | Liao et al. | 280/30 |
| 5,123,531 A | 6/1992 | Beretta | |
| 5,176,253 A * | 1/1993 | Perrin et al. | 206/315.5 |
| 5,215,194 A | 6/1993 | Blanford et al. | |
| 5,358,109 A | 10/1994 | Nichols | |
| 5,472,084 A | 12/1995 | Aliano, Jr. | |
| 5,474,175 A | 12/1995 | Gattis | |
| 5,501,328 A * | 3/1996 | Keller et al. | 206/315.6 |
| 5,632,496 A | 5/1997 | Nelson | |
| D382,707 S | 8/1997 | Wang | |
| 5,671,842 A | 9/1997 | Jaworski | |
| 5,911,322 A * | 6/1999 | Lombardo et al. | 206/315.3 |

(Continued)

FOREIGN PATENT DOCUMENTS

| | | |
|---|---|---|
| FR | 2989899 A1 * | 11/2013 |
| WO | PCT/EP91/01029 * | 12/1991 |
| WO | WO-2009/111237 A2 | 9/2009 |

OTHER PUBLICATIONS

*Aeroe Golf.* Turboweb. Web. Mar. 25, 2015. http://www.aeroegolf.com.

(Continued)

*Primary Examiner* — Sue A Weaver
(74) *Attorney, Agent, or Firm* — Mintz Levin Cohn Ferris Glovsky and Popeo, P.C.

(57) ABSTRACT

A golf bag system is described that can include a main golf bag and a removable golf bag. The main golf bag and removable golf bag can be releasably coupled together for transporting as a single unit (e.g., golf bag system) or as two separate units (e.g., main golf bag and removable golf bag). In some implementations, the removable golf bag can be configured to function at least similar to the golf bag system in that it can carry approximately fourteen golf clubs and include storage compartments for carrying golf balls, golf accessories, etc. Additionally, both the main golf bag and removable golf bag can include removable storage containers.

20 Claims, 7 Drawing Sheets

(56) References Cited

U.S. PATENT DOCUMENTS

| | | | |
|---|---|---|---|
| 5,918,737 A | 7/1999 | Kwon | |
| D413,018 S | 8/1999 | Boldig et al. | |
| 5,967,543 A * | 10/1999 | Taylor | 280/645 |
| D423,222 S | 4/2000 | Ryan | |
| 6,047,822 A * | 4/2000 | Batten | 206/315.6 |
| 6,126,050 A | 10/2000 | Aliano, Jr. | |
| D434,905 S | 12/2000 | Ryan | |
| 6,217,042 B1 | 4/2001 | Kurtz et al. | |
| 6,305,535 B1 | 10/2001 | Fair | |
| 6,330,944 B1 | 12/2001 | DeMichele | |
| 6,375,004 B1 | 4/2002 | Tuerschmann et al. | |
| 6,499,593 B1 | 12/2002 | Uner et al. | |
| 6,598,889 B1 * | 7/2003 | Su | 280/47.26 |
| 6,619,475 B2 | 9/2003 | Chang | |
| 6,640,970 B1 | 11/2003 | Townsend, Jr. | |
| 6,659,477 B2 * | 12/2003 | Jung | 280/47.26 |
| 6,712,205 B2 | 3/2004 | Lee | |
| 6,758,334 B2 | 7/2004 | Uner et al. | |
| 7,025,202 B2 | 4/2006 | Jansen et al. | |
| 7,044,298 B1 | 5/2006 | Pryst | |
| 7,059,470 B2 | 6/2006 | Slankster | |
| 7,077,274 B2 | 7/2006 | Laud et al. | |
| 7,090,075 B1 | 8/2006 | Rocha | |
| 7,150,123 B1 | 12/2006 | Fox | |
| D538,042 S | 3/2007 | Suggs | |
| 7,222,733 B2 | 5/2007 | Kim | |
| 7,481,311 B1 | 1/2009 | Old | |
| 7,549,534 B1 | 6/2009 | Parpart | |
| 7,775,353 B2 | 8/2010 | Kagen | |
| 7,905,349 B2 | 3/2011 | Campbell | |
| D654,268 S | 2/2012 | Boncimino et al. | |
| 8,201,686 B2 | 6/2012 | McGuire | |
| 8,424,679 B2 | 4/2013 | Campbell et al. | |
| 8,807,336 B2 | 8/2014 | McGuire | |
| 8,820,524 B2 | 9/2014 | Pactanac et al. | |
| 2002/0066763 A1 | 6/2002 | Hsueh | |
| 2004/0108234 A1 | 6/2004 | Meissner | |
| 2004/0232635 A1 * | 11/2004 | Cheldin | 280/47.26 |
| 2005/0199519 A1 | 9/2005 | Kim | |
| 2005/0258206 A1 | 11/2005 | Tan | |
| 2006/0272967 A1 | 12/2006 | Bremner | |
| 2007/0138223 A1 * | 6/2007 | Brown | 224/413 |
| 2007/0158159 A1 | 7/2007 | Burgess | |
| 2007/0241008 A1 | 10/2007 | Weavind | |
| 2007/0241009 A1 * | 10/2007 | Tan | 206/315.6 |
| 2008/0047639 A1 * | 2/2008 | Fox | 150/160 |
| 2008/0264814 A1 | 10/2008 | Campbell | |
| 2008/0296185 A1 | 12/2008 | Polo | |
| 2012/0048754 A1 * | 3/2012 | Niedermeier et al. | 206/315.3 |
| 2012/0085666 A1 | 4/2012 | McGuire | |
| 2012/0248165 A1 * | 10/2012 | Godfrey | 224/417 |
| 2012/0286490 A1 | 11/2012 | McGuire | |
| 2013/0306505 A1 * | 11/2013 | Walsh et al. | 206/315.7 |
| 2014/0346066 A1 | 11/2014 | Herron et al. | |
| 2015/0083618 A1 | 3/2015 | Herron et al. | |

OTHER PUBLICATIONS

European Patent Office Supplementary Partial European Search Report issued European Patent Application No. EP 09718209, dated Nov. 17, 2014.

European Patent Office Supplementary Partial European Search Report issued European Patent Application No. EP 09718209, dated Feb. 12, 2015.

International Search Report and Written Opinion issued in International Application No. PCT/US09/35103 dated Sep. 30, 2009.

\* cited by examiner

GOLF BAG HAVING A REMOVABLE GOLF BAG

TECHNICAL FIELD

The subject matter described herein relates to devices, systems and methods of a golf bag system having a main golf bag and a removable golf bag.

BACKGROUND

A golf bag can hold a variety of golf clubs, with each golf club providing various advantages for hitting a golf ball. A typical golf bag can be large and heavy, which can be why golfers use golf carts to assist with carrying their golf bags. In addition, golf bags can be difficult to travel with due to their weight and size. Due to each golf club providing a particular advantage for hitting a golf ball, a golfer may switch golf clubs at least once prior to hitting the golf ball as the golfer tries to find the best golf club to use under the present conditions; this is especially true as the golfer approaches the putting green. Therefore, a golfer can be found walking back and forth between a location of the golf ball and the golf bag, which can be too heavy to carry and is left attached to the golf cart.

SUMMARY

Aspects of the current subject matter can include various methods and implementations of a golf bag system. In one aspect, a golf bag system is described that can include a main golf bag having a coupling surface and an engagement feature. In addition, the golf bag system can further include a removable golf bag having an engaging feature that releasably engages the engagement feature for releasably coupling the removable golf bag to the main golf bag. The removable golf bag can further include a stabilizer that forms a first position, wherein the first position can include the stabilizer positioned within a stabilizer recess that extends a length along a side of the removable golf bag, and wherein the side of the removable golf bag can be mated against the coupling surface when the stabilizer is in the first position and the engaging feature is engaged with the engagement feature.

In another aspect, an implementation of the golf bag system can include a main golf bag having a coupling surface and an engagement feature. In addition, the golf bag system can include a removable golf bag having an engaging feature that releasably engages the engagement feature for releasably coupling the removable golf bag to the main golf bag. The removable golf bag can further include a stabilizer that forms a first position, wherein the first position includes the stabilizer positioned within a stabilizer recess that extends a length along a side of the removable golf bag, and wherein the side of the removable golf bag is mated against the coupling surface when the stabilizer is in the first position and the engaging feature is engaged with the engagement feature. Additionally, the golf bag system can include a quick-release mechanism that includes an activating part for activating the quick release mechanism, wherein activation of the quick-release mechanism can disengage the engaging feature from the engagement feature and detach the removable golf bag from the main golf bag. Furthermore, the golf bag system can include a handle positioned adjacent the activating part and a storage receptacle located on at least one of the main golf bag and the removable golf bag, wherein the storage receptacle is configured to releasably attach a removable storage container. In addition, the golf bag system can include a positioning feature adjacent a base of the main golf bag that is configured to engage the removable golf bag and prevent the removable golf bag from moving distally relative to the main golf bag.

In another aspect, a method of the golf bag system can include engaging a positioning feature adjacent a base of the main golf bag with the removable golf bag thereby preventing the removable golf bag from moving distally relative to the main golf bag. The method can further include attaching the removable golf bag to the main golf bag, wherein the attaching includes mating the contact surface of the main golf bag with the side of the removable golf bag. In addition, the method can further include engaging the engaging member of the removable bag with the engagement member of the main golf bag.

In some variations one or more of the following features can optionally be included in any feasible combination. For example, some implementations of the golf bag system can include the stabilizer forming a second position including the stabilizer extended at an angle from a body of the removable golf bag when the removable golf bag is detached from the main golf bag. The removable golf bag can further include a quick-release mechanism including an activating part for activating the quick release mechanism, wherein activation of the quick-release mechanism can disengage the engaging feature from the engagement feature and detach the removable golf bag from the main golf bag. In addition, the activating part can include one or more of a push-button, a touch-sensitive electronic interface, and a latch, and the removable golf bag can include a handle positioned adjacent the activating part.

Additionally, in some variations of the golf bag system, at least one of the main golf bag and the removable golf bag can include a storage receptacle configured to releasably attach a removable storage container and the removable storage container can include a face having an edge with the edge including features that releasably mate with the storage receptacle. Furthermore, the removable golf bag can be capable of holding at least ten golf clubs and the stabilizer can include a pair of legs. The removable golf bag can include a mount that releasably attaches to a top part of the removable golf bag and is configured to couple the removable golf bag to a golf cart. In addition, the removable golf bag can include a hood that releasably attaches to the mount and is configured to protect and secure contents within a main inner compartment of the removable golf bag.

In addition, in some variations of the golf bag system, the main golf bag can include a removable wheel assembly that is releasably secured to the main golf bag. Additionally, the main golf bag can include a positioning feature adjacent a base of the main golf bag that is configured to engage the removable golf bag and prevent the removable golf bag from moving distally relative to the main golf bag. Furthermore, the positioning feature can include an extruded lip. The coupling surface can be sized and shaped to conform to a part of an outer profile of the removable golf bag and the coupling surface can include a honeycomb-shaped material. At least one of the main golf bag or the removable golf bag can include a magnetic receptacle configured to magnetically attach an accessory, such as a golf glove, ball marker, personal identification tags, or the like. In addition, the removable golf bag can include rigid dividers.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

When playing a round of golf, a golfer will typically carry a golf bag that holds approximately fourteen different golf clubs. Each golf club can provide advantages for hitting a golf ball under various conditions and to achieve various results (e.g., remove the golf ball from a sand trap, putt the ball, etc.). In addition to golf clubs, the golf bag can hold golf balls and various other golf accessories, such as tees, a golf glove, a divot tool, water, snacks, money, and the like. As such, a typical golf bag can be large and heavy, which can be why golfers use golf carts to assist with carrying their golf bags. Furthermore, due to each golf club providing a particular advantage for hitting a golf ball, a golfer may switch golf clubs at least once prior to hitting the golf ball as the golfer tries to find the best golf club to use under the present conditions; this is especially true as the golfer approaches the putting green. When approaching the green, the golfer may not know whether he or she wants to use a putter, a sand wedge, a wedge, a 9-iron, or the like. Therefore, a golfer can be found walking back and forth between the location of the golf ball and the golf bag, which can be left attached to the golf cart. Alternatively, the golfer must carry a number of clubs to the green, risking leaving one or more clubs on the green after finishing the hole.

It would thus be an advantage for a golfer to have a way to carry a convenient and lightweight golf bag for transporting at least a smaller selection of golf clubs, such as when a golfer stops to hit a golf ball and has an idea of a range of golf clubs that are likely to be appropriate for the given conditions.

The current subject matter is directed to a golf bag system that includes a main bag and a removable bag that can be releasably coupled together for transporting as a single unit (e.g., golf bag system) or as two separate units (e.g., main bag and removable bag). The golf bag system can be approximately the same size as a typical golf bag and can allow a user to detach the removable bag from the main bag, such as for carrying a select number of golf clubs to a location and efficiently determine which golf club is best to use under the circumstances without having to walk back and forth to the golf cart, carry a heavy golf bag, or carry a number of individual clubs. In addition, the removable golf bag, although smaller, can be configured to function at least similar to the golf bag system in that it can carry approximately fourteen golf clubs and include storage compartments for carrying golf balls, golf accessories, or the like. Alternatively, the removable golf bag is configured to carry at least ten golf clubs. Alternatively still, the removable golf bag is configured to from ten to fourteen golf clubs. Alternatively still, the removable golf bag is configured to carry at least thirteen golf clubs. Alternatively still, the removable golf bag is configured to carry at least fourteen golf clubs. Additionally, both the main bag and removable bag can include improved features, such as removable storage containers. Various other improvements and advantages provided by the golf bag system is described and shown herein.

Figure 1:
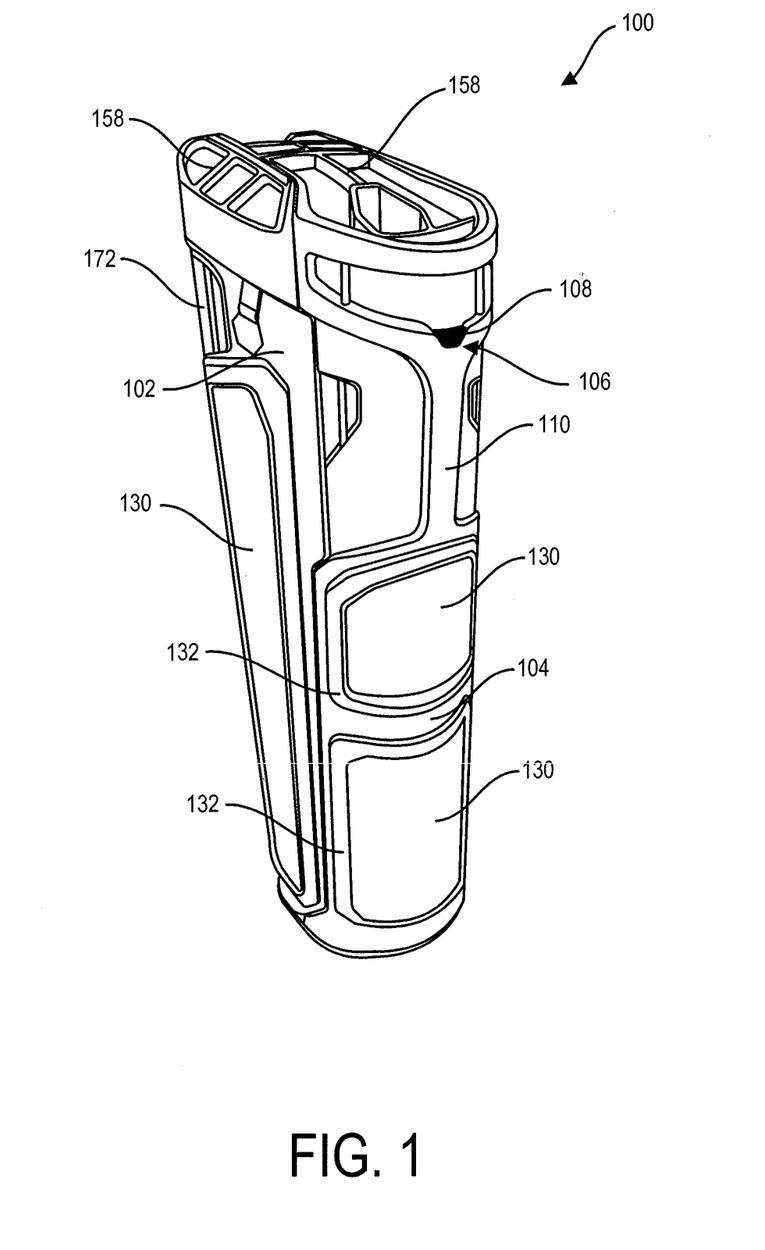
FIG. 1 shows an isometric view of an implementation of a golf bag system including a removable bag and a main bag in a combined configuration, in accordance with some implementations of the current subject matter.
Figure 2:
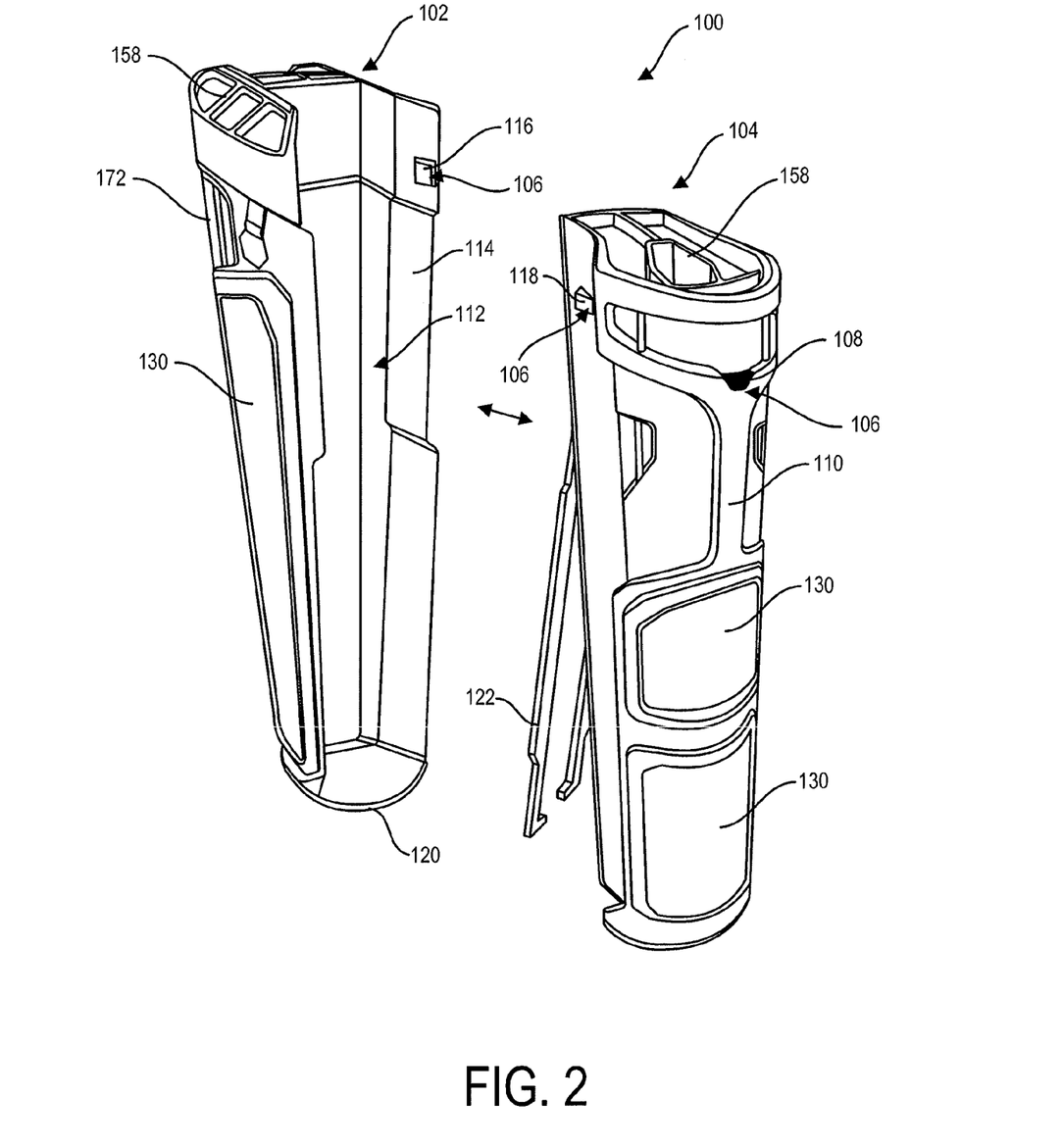
FIG. 2 shows the golf bag system of FIG. 1 with the removable bag detached from the main bag, in accordance with some implementations of the current subject matter.

FIG. 1 illustrates an implementation of a golf bag system 100 including a main bag 102 and a removable bag 104, with the removable bag 104 being configured to attach to and detach from the main bag 102. The golf bag system 100 can be used in a combined configuration (e.g., the removable bag 104 attached to the main bag 102, as shown in FIG. 1) or as separate units (e.g., the removable bag detached from the main bag, as shown in FIG. 2). For example, a user can detach the removable bag 104 for transporting a select number of golf clubs to a location of a golf ball and/or for traveling with a lighter and more compact golf bag.

The removable bag 104 can include a variety of features that allow the removable bag 104 to function similar to the main bag 102 or combined configuration, but with smaller dimensions for easier and lighter transport. The removable bag 104 can also be configured such that it can carry approximately fourteen golf clubs, which can allow the removable bag 104 to be used as a complete travel golf bag, without having to take the main bag. Advantages of using the removable bag 104 as a travel bag can include transporting a more compact and lighter unit, which can save on space and/or costs (e.g., airline baggage fees, room in the hotel, easier to transport in a rental car, and the like).

Some implementations of the removable bag 104 can include a quick-release (e.g., one-touch release) mechanism 106 that allows the removable bag 104 to be detached from the main bag 102 as a result of the user activating a part of the quick-release mechanism 106 with minimal effort. For example, an activating part 108 of the quick-release mechanism 106 can include a push-button, a touch-sensitive electronic interface, a latch, a hook, or the like. Furthermore, activating the activating part 108 of the quick-release mechanism 106 can include depressing the push-button, touching the touch-sensitive electronic interface, moving the latch, or the like. The quick-release mechanism 106 can include any one of a variety of unlocking mechanisms and interfaces that require minimal effort and steps (e.g., a single touch) from a user, which can allow the user to quickly and efficiently detach the removable bag 104 from the main bag 102. Additionally, in some implementations, either the removable bag 104 or the main bag 102 can include any part of the quick-release mechanism 108, which can include various engaging features that can releasably secure the removable bag 104 to the main bag 102.

As shown in FIG. 1, the activating part 108 of the quick-release mechanism 106 can be positioned along or adjacent to a handle 110 of the removable bag 104, which can allow the user to detach the removable bag 104 from the main bag 102 with the same hand that is gripping the handle 110. This can minimize the effort and number of steps required for the user to detach the removable bag 104 from the main bag 102. For example, the user can grip the handle 110 with the user's hand and activate the activating part 108 with a finger or thumb of the user's hand that is gripping the handle 110. As such, the user can detach the removable bag 104 and pull the removable bag 104 away from the main bag 102 with a single hand. Although the removable bag 104 is shown and described by way of example as having a handle 110, any number of a variety of gripping or grasping features can be included along the removable bag 104 for assisting the user with either attaching or detaching the removable bag 104 from the main bag 102.

FIG. 2 shows the removable bag 104 detached from the main bag 102. As shown in FIG. 2, the main bag 102 can include a removable bag interface 112 that is configured to interact with a part of the removable bag 104, such as when the removable bag 104 is attached to the main bag 102 and/or while attaching or detaching the removable bag 104 from the main bag 102. For example, the removable bag interface 112 can be located along a side of the main bag 102 and can include a coupling surface 114 that is sized and shaped to accept or conform to a part of an outer profile of the removable bag 104. For example, the coupling surface 114 can include a concave shape that conforms to a part of the outer profile of the removable bag 104 for storing the removable bag 104 against the side of the main bag 102 in a compact and secure configuration, as shown for example in FIG. 1. Furthermore, in some implementations, the coupling surface 114 can include a light-weight material, such as a honeycomb-shaped material, which can assist in reducing the overall weight of the golf bag system. The honeycomb-shaped material allows less material to be used while still maintaining a rigid structure, and is shown at 192 in FIG. 7.

In addition, the removable bag interface 112 can include a part of the quick-release mechanism 106 or a feature that interacts with the quick-release mechanism 106. As shown in FIG. 2, the main bag 102 can include one or more engagement features 116 that can be engaged by a part of the quick-release mechanism 106, such as one or more engaging features 118 associated with the removable bag 104. Engagement of the engaging features 118 with the engagement features 116 can assist with releasably coupling the removable bag 104 to the main bag 102.

In some implementations, the engaging feature 118 can include one or more spring-loaded locking features that are associated with the removable bag 104 and can engage the one or more engagement features 116 of the removable bag interface 112. Engagement of the spring-loaded locking features with the engagement features 116 can releasably secure the coupling of the removable bag 104 to the main bag 102. However, any number of locking features can be used for assisting with releasably securing the coupling of the removable bag 104 to the main bag 102.

The removable bag interface 112 can also include a positioning feature 120 that assists with positioning and securing the removable bag 104 relative to the main bag 102. For example, the positioning feature 120 can include a lip or extruded feature that can engage a part of the removable bag 104 and prevent the removable bag 104 from moving while in the combined configuration until the quick-release mechanism is activated.

As shown for example in FIG. 2, the positioning feature 120 can include an extruded lip positioned adjacent a distal end of the removable bag interface 112 or adjacent the base of the main bag 102. During use, the positioning feature 120 can prevent the removable bag 104 from sliding distally (e.g., towards the base of the main bag) relative to the main bag 102 when the removable bag 104 is attached to the main bag 102. In addition, the positioning feature 120 can also assist with attaching the removable bag 104 to the main bag 102 by providing a feature that the user can attach a part of the removable bag 104 to before or while securing the removable bag 104 to the main bag 102. This can assist with properly positioning the removable bag 104 before or while securely attaching the removable bag 104 to the main bag 102, which can minimize or prevent the user from having to make more than one attempt to correctly attach the removable bag 104 to the main bag 102.

In some implementations, the removable bag 104 can include a stabilizer 122 that can assist with stabilizing the removable bag 104 in an upright or angled position, such as when the removable bag 104 has been detached from the main bag 102. The stabilizer 122 can include a variety of features and configurations, such as a pair of legs that can be positioned at a variety of angles relative to the body of the removable bag 104. In some implementations, the stabilizer 122 can be spring loaded such that the stabilizer 122 can be easily expanded for use. In addition, the stabilizer 122 can include a locking mechanism that can prevent the stabilizer 122 from moving. For example, the locking mechanism can be unlocked by the user in order to move the stabilizer 122 into a desired position, such as either for supporting the removable bag 104 in a desired position or storing the stabilizer 122 in a compact configuration. The stabilizer 122 can be manufactured in a variety of ways, including injection molded, and can be made out of a variety of materials, such as plastic, metal, titanium, and/or carbon fiber.

Figure 7:
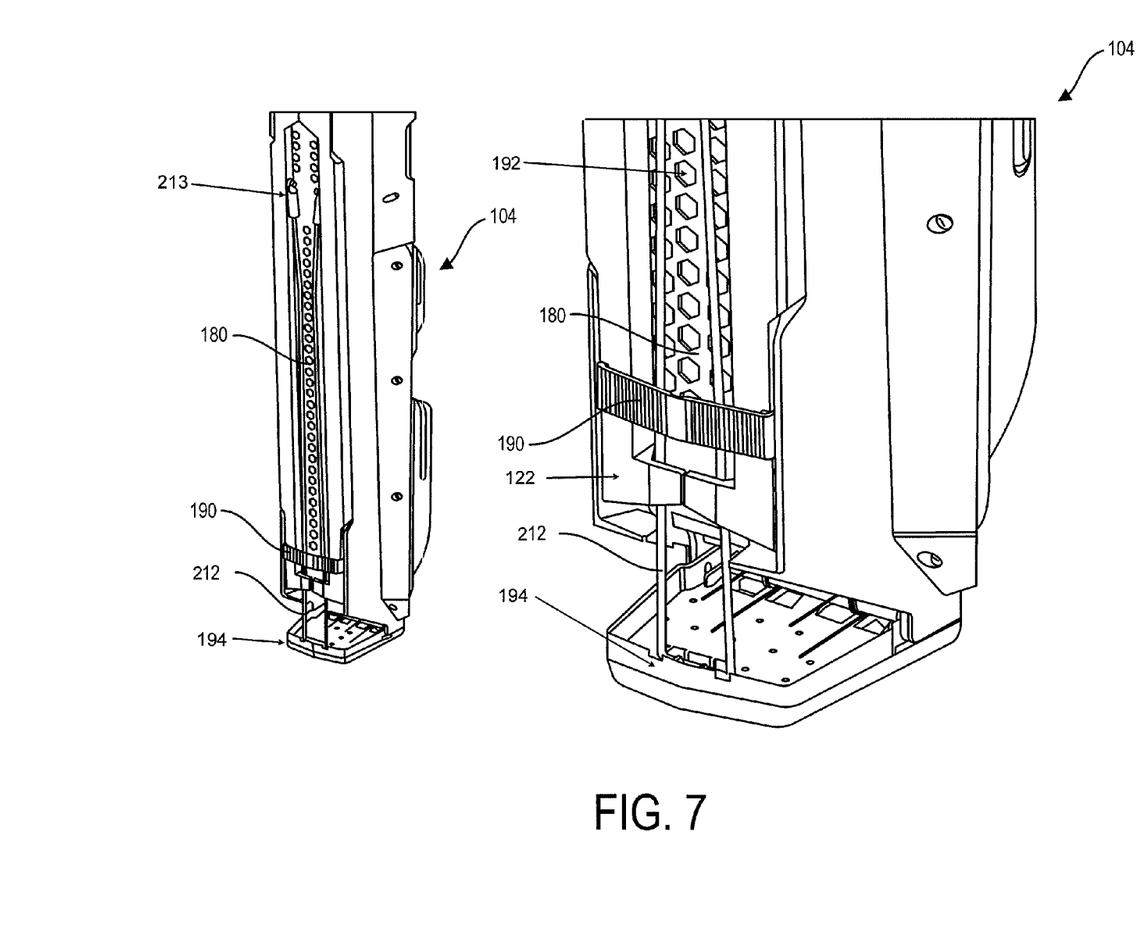
FIG. 7 shows a rear view of the removable bag of FIG. 1, including a close-up view of the bottom portion of the removable bag of FIG. 4, in accordance with some implementations of the current subject matter.

In addition, the removable bag 104 can include a stabilizer recess 180, as shown in FIG. 7 that can allow the stabilizer 122 to lay flush (or flat) with the removable bag 104 when the stabilizer 122 is in a compact or collapsed configuration, including when the removable bag 104 is attached to the main bag 102. This can allow the stabilizer 122 to lay flush with a side of the removable bag 104, such as the side that mates with the removable bag interface 112 or coupling surface 114 of the main bag 102 when the golf bag system is in the combined configuration (e.g., removable bag 104 attached to the main bag 102). As such, this can allow the combined configuration to form a more compact configuration. The main bag 102 can also include a stabilizer that can assist with stabilizing a position of either the main bag 102 or golf bag system 100.

According to one embodiment, the stabilizer 122 is connected to push rods 212. The push rods 212 push out stabilizer 122 when stabilizer 122 is desired to be used. Push rods 212 connect to stabilizer 122 via connector 213. Connector 213, in one embodiment, comprises a swivel or some other method of connecting stabilizer 122 and push rods 212. Alternatively, connector 213 can slide up and down stabilizer 122.

When a user removes removable bag 104 from the main bag 102, the stabilizer 122 remains flush against removable bag 104. When the user desires to have removable bag 104 stand upright on its own, clip 190 is removed (if not previously removed), removable bag 104 leans back pushing the bag against bottom portion 194, and causing the push rods 212 to push out stabilizer 122. Once pushed out, stabilizer 122 then is in an angled position to allow the removable bag to stand freely, which is shown for example in FIGS. 5 and 6.

According to one embodiment, the stabilizer 122 can include feet that help keep the stabilizer 122 be positioned correctly. The feet can be a part of the stabilizer 122 or a separate piece. The feet can be angled and be wider to better support removable bag 104. If a separate piece, the feet can be made of a plastic or rubber that is attachable to the end of the stabilizer 122. When the stabilizer 122 is rendered flush against the bag, if wider feet are used, a cutout in the bag to allow for the wider feet can allow the entire stabilizer to be flush.

In one embodiment, stabilizer 122 can comprise a honeycomb like structure to provide additional rigidity and tensile strength for stabilizer 122.

In addition, either the main bag 102 or the removable bag 104 can include one or more removable storage containers 130 that can be attached and detached from one or more storage receptacles 132. The removable storage containers 130 can have a variety of shapes, sizes, and characteristics (e.g., colors, logos, etchings, stitches, designs, and the like), and can be configured to contain a variety of objects (e.g., golf balls, golf accessories, golf gloves, tees, divot tools, and the like). In addition, the storage receptacles 132 can have a variety of shapes and sizes and can be configured to allow a variety of complimenting (e.g., similar shape and size) removable storage containers 130 to be attached and detached.

Figure 3:
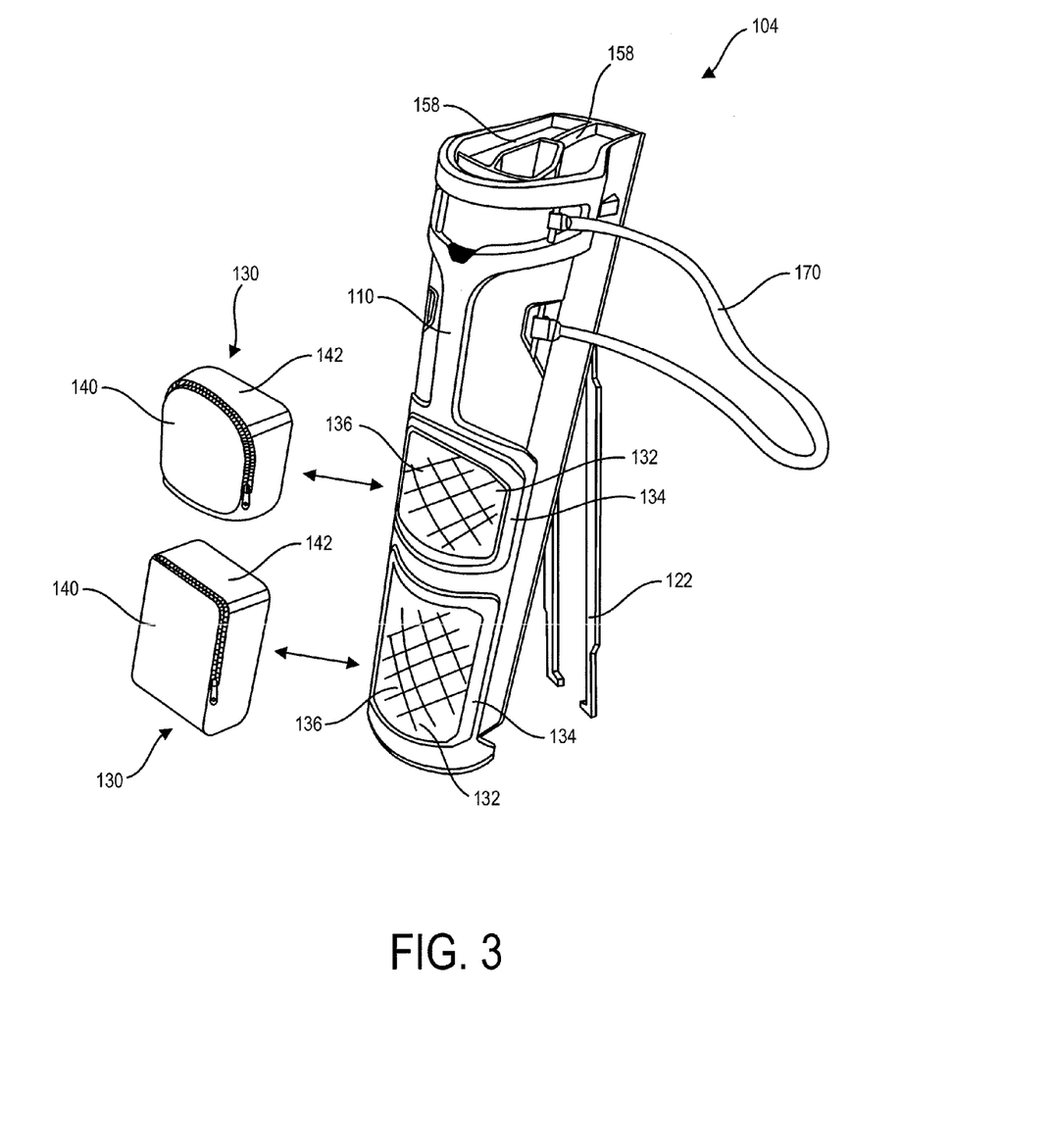
FIG. 3 shows an isometric view of the removable bag of FIG. 1 being supported by a stabilizer and removable storage containers shown detached from the storage receptacle, in accordance with some implementations of the current subject matter.

FIG. 3 illustrates an example of removable storage containers 130 detached from complimenting storage receptacles 132. The storage receptacles 132 and/or the removable storage containers 130 can include a variety of features for allowing the removable storage containers 130 to be secured to and detached from the storage receptacles. For example, the removable storage container 130 can include a face 140 having edges 142 that are shaped to releasably couple to a frame 134 of the storage receptacle 132. In some implementations, the frame 134 can include a sealing or gripping feature that can engage the edges 142 of the removable storage container 130 for securing the positioning of the removable storage container 130 within at least a part of the storage receptacle 132.

The ability to remove and exchange the removable storage containers 130 can allow a user to easily customize the golf bag system 100, such as with removable storage containers 130 having different colors, logos, and/or contents. In addition, a user can more easily pack and unpack items (e.g., golf balls, etc.) by allowing the user to simply attach and detach desired removable storage containers 130 to the golf bag system 100. For example, a golfer can have a first storage container that holds all white balls and a second storage container having all yellow balls. The golfer can then select the storage container he or she desires to use for a particular golf trip based on the various contents. In another example, the golfer can have a first storage container with a particular university logo and a second storage container without such a logo. When the golfer is golfing with a friend that attended that particular university, the golf can choose to use the first storage container. When golfing with someone else, the golfer can choose to use the second storage container.

Figure 4:
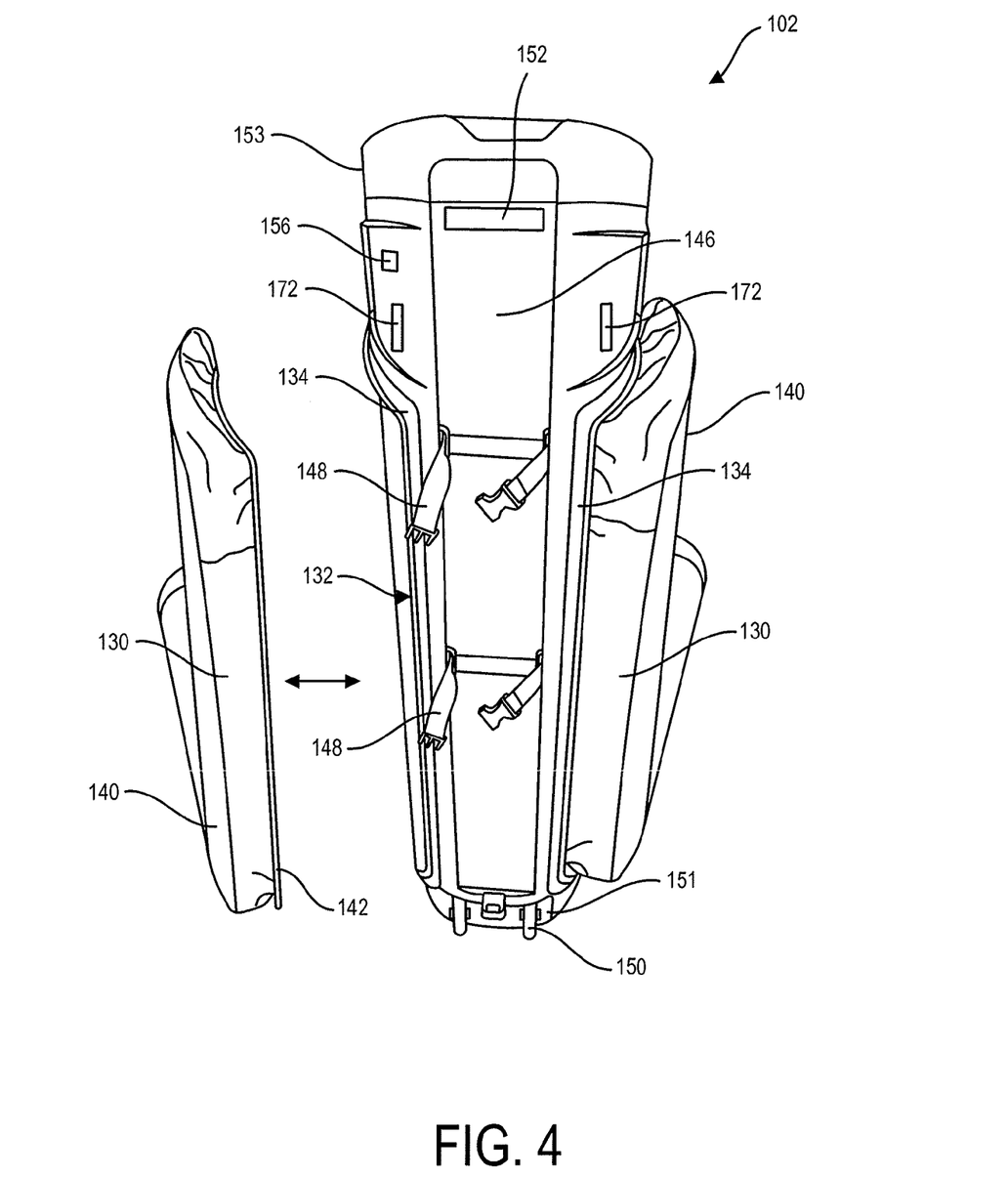
FIG. 4 illustrates a rear view of the main bag of FIG. 1 showing an elongated storage cavity along a side of the main bag and removable storage containers shown detached and attached to storage receptacles, in accordance with some implementations of the current subject matter.

FIG. 4 illustrates an implementation of the main bag 102 showing a removable storage container 130 attached to a complimenting storage receptacle 132 and another removable storage container 130 detached from a complimenting storage receptacle 132. The removable storage containers 130 can be attached and detached from complimenting storage receptacles 132 located on either the removable bag 104 or the main bag 102. As discussed above, the removable storage containers 130 and storage receptacles 132 can have a variety of shapes, sizes, and appearances.

In some implementations, the removable storage containers 130 can include a storage locking mechanism that allows the removable storage containers 130 to be detached from a storage receptacle 132 as a result of a user activating the storage locking mechanism. The storage locking mechanism can include a quick-release or one-touch release mechanism for fast removal of the removable storage containers 130 from the storage receptacles 132. Any of a variety of features can be used to attach and detach the removable storage containers 130 from the storage receptacles, including snaps, magnets, zippers, Velcro, buttons, hocks, and the like.

In addition, some implementations of the storage receptacles 132 can include an inner lining 136 (e.g., a mesh lining) that can be configured to line the inside of the storage receptacles 132, as shown, for example, in FIG. 3. The inner lining 136 can provide a light-weight covering within the storage receptacles 132, which can also shield contents (e.g., golf clubs, golfing accessories, and the like) within either the main bag 102 or removable bag 104.

The main bag 102 can also include an elongated storage cavity 146 that extends along a length of the main bag 102, as shown in FIG. 4. The elongated storage cavity 146 can include attachment features 148 that can assist with securing an item within the elongated storage cavity 146. The elongated storage cavity 146 can be sized and shaped to allow a variety of items to be secured within the elongated storage cavity 146, and the attachment features 148 can include a variety of features for releasably securing items to the elongated storage cavity 146. For example, the elongated storage cavity 146 can be sized and shaped to accept an umbrella along a length of the elongated storage cavity 146. In addition, the attachment features 148 can include buckled straps that can assist with securing the umbrella within the elongated storage cavity 146. In some implementations, the elongated storage cavity 146 can be sized and shaped such that when an item, such as an umbrella, is secured within the elongated storage cavity 146, the item is flush with an outer edge of the main bag 102, which can allow for a compact configuration. Alternatively, the elongated storage cavity can include a cover or pouch to protect the contents, such as the umbrella.

Some implementations of the main bag 102 can include one or more wheels 150, which can allow either the main bag 102 or golf bag system 100 to be wheeled around. In addition, the wheels 150 can be removable from the main bag 102. As such, the user can remove and re-attach the wheels 150 to the main bag 102, such as to the base of the main bag 102. The wheels can be removed as a removable wheel assembly 151, such that the removed unit includes two wheels and an attachment piece, such that the removable wheel assembly 151 is easy to carry or set aside. When the removable wheel assembly 151 is not attached, there is simply a cavity in the golf bag system 100 that is not noticeable. The removable wheel assembly 151 can be attached and reattached to the golf bag system 100 using a quick-release or one-touch release mechanism, some other locking mechanism, snaps, magnets, zippers, Velcro, buttons, hocks, and the like. Alternatively, the removable wheel assembly 151 is also or instead removably attached to the removable golf bat 104, In addition, the main bag 102 can include a main bag handle 152 that can allow a user to grasp the main bag handle 152 for moving either the main bag 102 or golf bag system 100. As mentioned above, the removable bag 104 can include a handle 110, which can allow a user to grasp in order to move either the removable bag 104 or the golf bag system 100.

Additionally, some implementations of the golf bag system 100 can include a magnetic receptacle 156 (as shown in FIG. 4), which can allow at least one accessory to be magnetically attached and detached from the golf bag system 100, such as along an outer surface of the golf bag system 100. The accessory can be, for example, a golf glove, ball marker, personal identification tags, corporate logo, country club logo, magnet tees, other golfing related implements that can be attached using a magnet, or the like. Although the magnetic receptacle 156 is shown as being positioned along the main bag 102, the golf club system 100 can include a magnetic receptacle 156 on either the main bag 102 or the removable bag 104. Furthermore, there can be more than one magnetic receptacle 156, and the magnetic receptacles 156 can be positioned in any of a variety of locations along the golf club system 100.

Some implementations of the golf bag system 100 can include dividers 158, as shown, for example, in FIGS. 1-3. The dividers can be rigid and extend a length along an inside compartment of either the removable bag 104 or the main bag 102, such as for providing separate compartments for golf clubs. The length the dividers extend can be along the entire bag or along just a top portion of the bag 153 (shown in FIG. 4). However, either the main bag 102 or the removable bag 104 may not include dividers 158. Some implementations of the dividers 158 can include elastomeric inserts, which can be made out of, for example, various rubber materials having a variety of properties. The elastomeric inserts can assist with reducing noise associated with golf club movement against the dividers 158. As such, a two-shot molding process can be used to manufacture the dividers 158, with the first molding process including forming the dividers 158 and the second molding process including covering a part of the dividers 158 with an elastomeric material that can form the elastomeric inserts. The elastomeric inserts can extend along a part of the dividers, such as along and down a length from the upper exposed edges, or along the entire length of the dividers 158.

Some implementations of the golf bag system 100 can include an exoskeleton that is made out of a durable and lightweight material, such as plastic, titanium, carbon fiber, etc. In addition, either the main bag 102 or the removable bag 104 can include the exoskeleton that is made out of the durable and lightweight material.

In addition, some implementations of the golf bag system 100 can include a carrying strap 170, as shown in FIG. 3, for assisting a user with carrying the golf bag system 100. Carrying strap 170 can be attached to the golf bag system 100 using strap bars, Velcro®, buttons, sewn onto the bag, or any other manner in which carrying strap 170 can be attached to the bag. Additionally, some implementations of the golf bag system 100 can include one or more strap receptacles 172, as shown in FIG. 4, which can assist with securing the golf bag system 100 to a golf cart. For example, the golf bag system 100 can include a strap receptacle 172 positioned on opposing sides of the golf bag system 100 (e.g., two strap receptacles 172), which can allow a securing strap associated with the golf cart to be inserted through the strap receptacles 172 and provide a more secure coupling of the golf bag system 100 to the golf cart.

The improved secure coupling of the golf bag system 100 to the golf cart can be due, at least in part, to the golf bag system 100 including more than one strap receptacle 172, which can result in a more stable and balanced coupling of the golf bag system 100 to the golf cart. In addition, the securing strap associated with the golf cart can extend around a back side (e.g., opposite side from where the removable bag 104 attaches to the main bag 102) of the golf bag system 100, which can allow easy and efficient removal of the removable bag 104 from the main bag 102 while the main bag 102 remains strapped to the golf cart.

Figure 5:
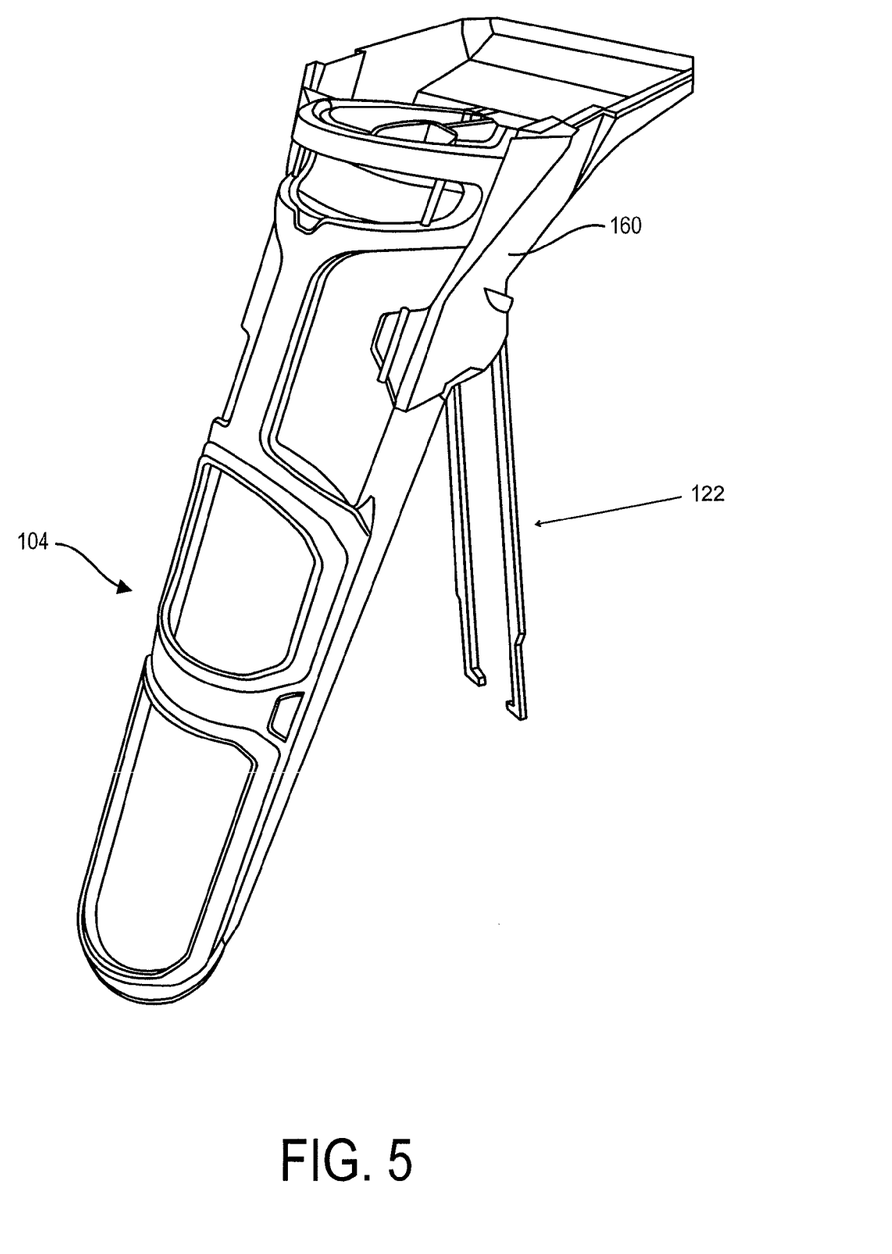
FIG. 5 shows an isometric view of the removable bag of FIG. 1 including a mount that can assist with attaching the removable bag to a golf cart, in accordance with some implementations of the current subject matter.

FIG. 5 illustrates an implementation of a mount 160 that can be attached and detached from the removable bag 104. The mount 160 can attach to a top portion of the removable bag 104 and can assist with securing the removable bag 104 to a golf cart, for example, when a user is only using the removable bag and not using the main bag. For example, a user can take only the removable bag 104 to play golf and can use the mount 160 for securing the removable bag 104 to a golf cart. The mount 160 can include a quick-release or one-touch release mechanism that allows the user to quickly and easily remove the mount 160 from the removable bag 104. In some implementations, the mount 160 can include strap handles that allow the mount to be attached to the golf cart using the straps of the golf cart. In addition, the mount 160 can include pouches to hold items, a magnet to hold a golf glove (similar to magnetic receptacle 156), slots to hold golf tees, and the like.

Figure 6:
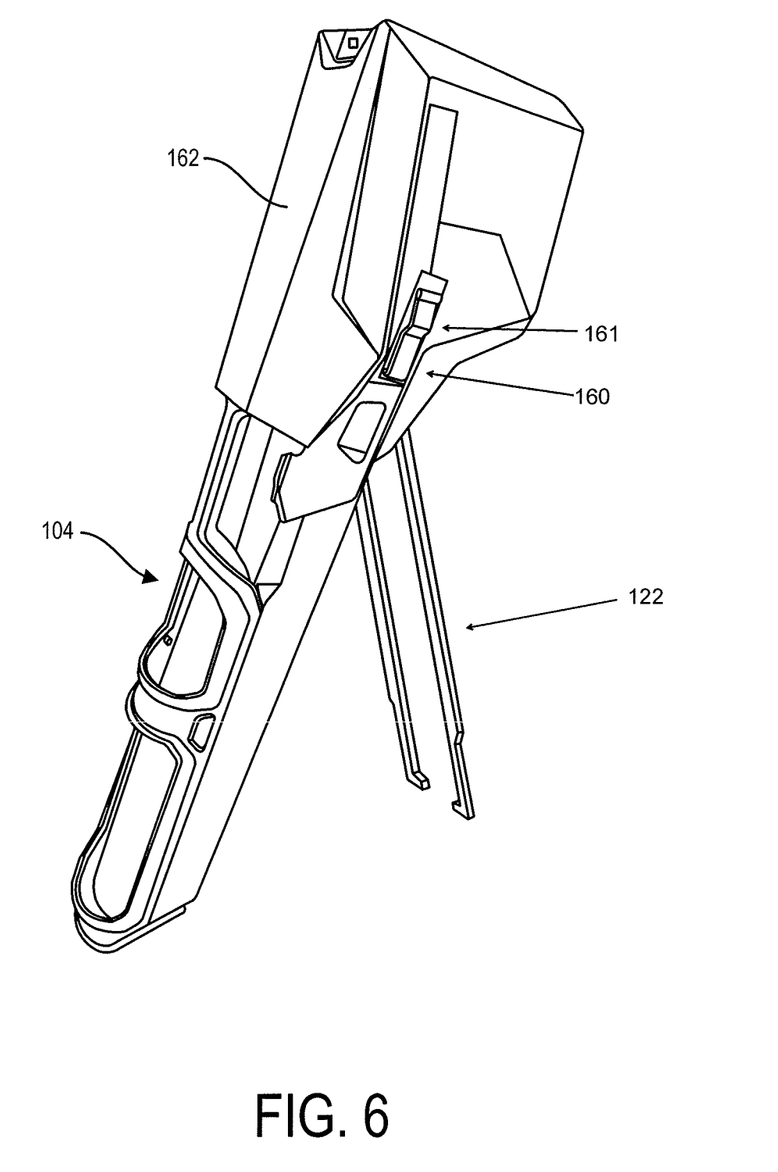
FIG. 6 shows an isometric view of the removable bag of FIG. 1 including a hood that can assist with protecting and securing contents within the removable bag, in accordance with some implementations of the current subject matter.

FIG. 6 illustrates an implementation of a hood 162 that can be attached and detached from the removable bag 104 and/or mount 160. The hood 162 can attach to a top portion of the removable bag 104 or mount 160 using latch 161, and can assist with covering at least the top portion of the removable bag 104, such as for protecting and securing contents within a main inner compartment of the removable bag 104 during transport or travel. The hood 162 can also include a quick-release or one-touch release mechanism that allows the user to quickly and easily remove the hood 162 from the removable bag 104. Alternatively, hood 162 can be attached to the removable bag 104 and/or mount 160 using some other locking mechanism, latching mechanism, snaps, magnets, zippers, Velcro, buttons, hocks, and the like. In addition, hood 162 can include pouches to hold items, a magnet to hold a golf glove (similar to magnetic receptacle 156), slots to hold golf tees, and the like.

Traveling with just the removable golf bag with the hood and mount can be considerably lighter than traveling with a traditional golf bag. For example, a traditional golf bag can weigh approximately 5 pounds and a traditional golf club case can weight 30-40 pounds. The removable golf bag, being smaller can weight approximately 4.5 pounds, but the hood and mount only weigh approximately 2 pounds, making traveling with the removable golf bag more convenient than traveling with a traditional golf bag.

As shown in FIG. 7, the golf bag system 100 can include a securing clip 190 that can assist with securing the stabilizer 122 in a compact configuration, such as while the traveling with the removable bag 104 detached from the main bag 102. The securing clip 190 can be removably attached to removable bag 104. To avoid securing clip 190 being lost, securing clip 190 can also be stored along various parts of the golf bag system 100 when not in use, including on the hood 162, on the main bag 102, in a pocket, on the mount 160, or the like.

The removable golf hag 104 can include handles on the top, bottom and side to allow for easier transport of the bag. For example, the handle 110 of the removable hag 104 can be positioned along a front face of the removable bag 104, which can allow a user to easily insert and attach the removable bag 104 to the main bag 102. Insertion of the removable bag 104 into the main bag 102 can include directly inserting the side of the removable bag 104 in a linear movement towards the coupling surface of the main bag. This can at least minimize, including prevent, the user from having to lift the removable bag above the top of the main bag 102 in order to couple the removable bag 104 to the main bag 102, which can reduce strain incurred by the user (e.g., from excessive lifting) and improve usability of the golf bag system 100.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. The current subject matter may be embodied in other specific forms besides and beyond those described herein. Further, the implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A golf bag system, comprising:
a main golf bag having a coupling surface and an engagement feature; and
a removable golf bag having an engaging feature that releasably engages the engagement feature for releasably coupling the removable golf bag to the main golf bag, the removable golf bag further comprising a stabilizer that forms a first position, the stabilizer comprising an elongated shaft with a stabilizing foot at a distal end of the elongated shaft, the stabilizing foot being wider than the elongated shaft, wherein the first position comprises the elongated shaft and stabilizing foot positioned within a stabilizer recess that extends a length along a side of the removable golf bag thereby allowing the side of the removable golf bag to mate against the coupling surface when the stabilizer is in the first position and the engaging feature is engaged with the engagement feature.

2. The golf bag system of claim 1, wherein the stabilizer forms a second position comprising the stabilizer extended at an angle from a body of the removable golf bag when the removable golf bag is detached from the main golf bag.

3. The golf bag system of claim 1, wherein the removable golf bag further comprises a quick-release mechanism including an activating part for activating the quick release mechanism, wherein activation of the quick-release mechanism disengages the engaging feature from the engagement feature and detaches the removable golf bag from the main golf bag.

4. The golf bag system of claim 3, wherein the activating part includes one or more of a push-button, a touch-sensitive electronic interface, and a latch.

5. The golf bag system of claim 3, wherein the removable golf bag includes a handle positioned adjacent the activating part.

6. The golf bag system of claim 1, wherein at least one of the main golf bag and the removable golf bag includes a storage receptacle configured to releasably attach a removable storage container.

7. The golf bag system of claim 6, wherein the removable storage container includes a face having an edge with the edge including features that releasably mate with the storage receptacle.

8. The golf bag system of claim 1, wherein the removable golf bag is capable of holding at least ten golf clubs.

9. The golf bag system of claim 1, wherein the stabilizer includes more than one elongated shaft.

10. The golf bag system of claim 1, wherein the removable golf bag includes a mount that releasably attaches to a top part of the removable golf bag and is configured to assist with coupling the removable golf bag to a golf cart.

11. The golf bag system of claim 10, wherein the removable golf bag includes a hood that releasably attaches to the mount and is configured to protect and secure contents within a main inner compartment of the removable golf bag.

12. The golf bag system of claim 1, wherein the main golf bag includes a removable wheel assembly that is releasably secured to the main golf bag.

13. The golf bag system of claim 1, wherein the main golf bag includes a positioning feature adjacent a base of the main golf bag that is configured to engage the removable golf bag and prevent the removable golf bag from moving distally relative to the main golf bag.

14. The golf bag system of claim 13, wherein the positioning feature includes an extruded lip.

15. The golf bag system of claim 1, wherein the coupling surface is sized and shaped to conform to a part of an outer profile of the removable golf bag.

16. The golf bag system of claim 1, wherein at least one of the main golf bag or the removable golf bag includes a magnetic receptacle configured to magnetically attach at least one accessory.

17. The golf bag system of claim 1, wherein the removable golf bag comprises rigid dividers extending a length along an inside compartment of the removable golf bag.

18. A golf bag system, comprising:
a main golf bag having a coupling surface and an engagement feature;
a removable golf bag having an engaging feature that releasably engages the engagement feature for releasably coupling the removable golf bag to the main golf bag, the removable golf bag further comprising a stabilizer that forms a first position, the stabilizer comprising an elongated shaft with a stabilizing foot at a distal end of the elongated shaft, the stabilizing foot being wider than the elongated shaft, wherein the first position comprises the elongated shaft and stabilizing foot positioned within a stabilizer recess that extends a length along a side of the removable golf bag thereby allowing the side of the removable golf bag to mate against the coupling surface when the stabilizer is in the first position and the engaging feature is engaged with the engagement feature a quick-release mechanism including an activating part for activating the quick release mechanism, wherein activation of the quick-release mechanism disengages the engaging feature from the engagement feature and detaches the removable golf bag from the main golf bag;

a handle positioned adjacent the activating part;

a storage receptacle located on at least one of the main golf bag and the removable golf bag, wherein the storage receptacle is configured to releasably attach a removable storage container; and a positioning feature adjacent a base of the main golf bag that is configured to engage the removable golf bag and prevent the removable golf bag from moving distally relative to the main golf bag.

19. A method, comprising:

disengaging, in response to activation of an activating part of a golf bag system, an engaging member of a removable bag of the golf bag system from an engagement member of a main golf bag of the golf bag system; and detaching the removable golf bag from the main golf bag, wherein the detaching includes separating a contact surface of the main golf bag from a side of the removable golf bag, wherein the side includes a stabilizer that is exposed upon separation of the contact surface and the side, the stabilizer comprising an elongated shaft with a stabilizing foot at a distal end of the elongated shaft with the stabilizing foot being wider than the elongated shaft, the side comprising a recess that extends along the side and shaped to allow the elongated shaft and stabilizing foot to completely lay within the recess thereby allowing the side of the removable golf bag to mate against the coupling surface when the removable bag is attached to the main golf bag.

20. The method of claim 19, further comprising:

engaging a positioning feature adjacent a base of the main golf bag with the removable golf bag thereby preventing the removable golf bag from moving distally relative to the main golf bag;

attaching the removable golf bag to the main golf bag, wherein the attaching includes mating the contact surface of the main golf bag with the side of the removable golf bag; and engaging the engaging member of the removable bag with the engagement member of the main golf bag.

* * * * *